United States Patent [19]

Hunsucker

[11] 4,243,800

[45] Jan. 6, 1981

[54] STRIPPABLE COATING RESIN FROM NITROALKANOL AND POLYAMINE

[75] Inventor: Jerry H. Hunsucker, Terre Haute, Ind.

[73] Assignee: International Minerals & Chemical Corp., Terre Haute, Ind.

[21] Appl. No.: 25,641

[22] Filed: Mar. 30, 1979

[51] Int. Cl.$^3$ .............................................. C08G 73/00
[52] U.S. Cl. .............................. 528/422; 260/29.2 N; 260/33.4 R; 428/411; 428/524; 528/266; 528/423
[58] Field of Search ................................ 528/422, 423

[56] References Cited

U.S. PATENT DOCUMENTS 2,475,347   7/1949   Arthur et al. ........................ 528/422

Primary Examiner—Harold D. Anderson
Attorney, Agent, or Firm—Robert H. Dewey

[57] ABSTRACT

A strippable coating resin obtained by the process comprising the step of reacting tris(hydroxymethyl)nitromethane with an aliphatic polyamine of 2 to 10 carbon atoms in a mole ratio of 1 to 0.5–1.0 at ambient temperatures in the presence of a monoamine or an alkanolamine.

4 Claims, No Drawings

STRIPPABLE COATING RESIN FROM NITROALKANOL AND POLYAMINE

BACKGROUND OF THE INVENTION

This invention relates to a polymeric substance. In a particular aspect, this invention relates to a polymeric substance useful in the formulation of a strippable coating.

Strippable coatings are widely used in a variety of applications. Typical is the use of such a coating to protect paint spray booths so that they can be readily cleaned. Also, it is frequently desirable to apply a temporary coating to an object to protect it from corrosion, dirt and weather until it has been fabricated, for instance, and ready to receive the permanent coating. Such coatings should be low cost, easily applied and easily removed, since they are merely temporary.

SUMMARY OF THE INVENTION

It is an object of this invention to provide a polymeric substance.

It is another object of this invention to provide a polymeric substance suitable for use in a strippable coating.

Other objects of this invention will be apparent to those skilled in the art from the disclosure herein.

It is the discovery of this invention to provide a resinous composition comprising the reaction product of a nitroalkanol and an aliphatic polyamine. The nitroalkanol is represented by the formula

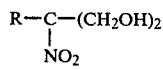

where R is methyl, ethyl or hydroxymethyl. The nitroalkanol is reacted with the polyamine in a mole ratio of 1 to 0.5–1.0 at ambient temperatures. The resin thereby obtained is useful in the formulation of strippable coatings.

DETAILED DISCUSSION

The nitroalkanols useful in the practice of this invention are polyols of at least two methylol groups and include 2-nitro-2-methyl-1,3-propanediol (NMPD); 2-nitro-2-ethyl-1,3-propanediol (NEPD) and 2-nitro-2-hydroxymethyl-1,3-propanediol. The latter is also known as tris(hydroxymethyl)nitromethane, or TN. All are known in the art and all are commercially available.

Polyamines suitable for the practice of this invention are primary amines and include those having from 2 to 10 carbon atoms or more and from 2 to 5 or more primary amino groups. They include, but are not limited to, ethylene diamine, propylene diamine, butylene diamine, hexamethylene diamine, hexamethylene tetramine and tetraethylene pentamine. Such compounds are known in the art. The preferred amines are tetraethylene pentamine and hexamethylene diamine.

The resins are readily prepared by reacting the nitroalkanol with the polyamine in a mole ratio of about 1 to 0.5–1.0, respectively. The reaction proceeds at room temperature and is exothermic. Preferably some cooling is provided to prevent undesirable heat generation. A solvent can be used if desired, e.g. water or a lower aliphatic alcohol. Water is preferred.

The resin is soluble in the lower aliphatic alcohols, ketones and water. For use as a strippable coating, the resin is preferably dissolved in water and applied by brushing, spraying, dipping or by electrostatic methods.

When TN is used as the nitroalkanol, it is preferred to use a primary monoamine or alkanolamine as a portion of the amine to retard the reaction rate somewhat. A preferred alkanolamine is 2-amino-2-methyl-1-propanol, although any alkanolamine of 2 to 6 carbon atoms can be used. The monoamine can be used in a mole ratio of up to about 1:1 of TN.

It is an embodiment of the present invention that the nitroalkanol can be prepared in situ by substituting a nitroalkane of 1 to 3 carbon atoms and formaldehyde for the nitroalkanol. The nitroalkane is used in a 1:1 mole ratio based on the nitroalkanol, and the formaldehyde is used in a 2-3 mole ratio based on the nitroalkane. The formaldehyde used is preferably the 37% by weight article of commerce, or it can be supplied as paraformaldehyde. Alkanol solutions of formaldehyde can also be used.

The invention described and claimed herein will be better understood with reference to the following examples. It is understood, however, that the examples are merely intended to illustrate the invention and they are not intended to be limiting.

EXAMPLE 1

To a reaction vessel there was delivered 2-nitro-2-ethyl-1,3-propanediol (NEPD) 15.0 g (0.1 mole) dissolved in water 13 g. Tetraethylene pentamine 18.9 g (0.1 moles) was added with cooling and mixed thoroughly. The reaction was very rapid and no heating was required. A 3 mil wet film of the solution obtained was drawn down on each of two steel Q-panels and the panels were baked at 300° F. for 15 minutes. The pencil hardness of the one baked 15 minutes was 9 H and the reverse impact was 80 lbs.

The aqueous dispersion of the resin prepared above is used as a strippable coating on a metal surface by applying thereto by brushing or spraying and allowing to air-dry. No baking is necessary.

EXAMPLE 2

The experiment of Example 1 was repeated in all essential details except that 15 g of tris(hydroxymethyl)-nitromethane (0.1 mole) dissolved in 15 g of water was substituted for NEPD. The pencil hardness was 9 H and the reverse impact was 80 lbs. The resin solution thereby obtained is suitable for use as strippable coating.

EXAMPLE 3

The experiment of Example 1 is repeated in all essential details except that 2-nitro-2-methyl-1,3-propanediol (NMPD) is substituted on an equi-molar basis for NEPD. There is obtained a resin solution suitable for use as a strippable coating.

EXAMPLE 4

TN 15 g (0.1 mole) dissolved in water was mixed with hexamethylenediamine 5.8 g (0.05 mole) using high speed stirring. A wet film, 3 mil, was drawn down on each of 3 steel Q-panels. One was baked for 15 minutes at 300° F., another for 30 minutes at 300° F. and the third was allowed to air dry for 48 hours at room temperature.

The two baked coatings were harder than a 9 H pencil hardness. The unbaked coating had a hardness of H and a reverse impact of 80 lb. The baked coatings had a reverse impact of less than 2 lb.

EXAMPLE 5

TN 7.5 g (0.05 mole) dissolved in water 15 g was mixed with 2-amino-2-methyl-1-propanol 4.5 g (0.05 mole) and hexamethylene diamine 11.8 g (0.1 g). A 3 mil wet film was drawn down on two steel panels. One was baked at 300° F. for 15 minutes and the other was baked at 300° F. for 30 minutes. Both had a pencil hardness greater than 9 H. The one baked for 15 minutes had a reverse impact of 80 and the one baked for 30 minutes had a reverse impact of 30.

EXAMPLE 6

The experiment of Example 1 is repeated in all essential details except that 1-nitropropane 8.9 g (0.1 mole) is substituted for NEPD and formaldehyde, 16.2 g of 37% solution (0.2 mole) is added. There is obtained a resinous composition dispersed in water. It is suitable for use as a strippable coating.

I claim:

1. A composition comprising (1) 2-amino-2-methyl-1-propanol and (2) the resinous reaction product of (a) tris(hydroxymethyl)nitromethane and (b) an aliphatic polyamine selected from the group consisting of ethylene diamine, propylene diamine, butylene diamine, hexamethylene diamine and tetraethylene pentamine, wherein the reaction is conducted in the presence of the 2-amino-2-methyl-1-propanol in a ratio of up to 1:1 per mole of nitrohydroxy compound.

2. The composition of claim 1 wherein the polyamine is tetraethylene pentamine.

3. The composition of claim 1 wherein the polyamine is hexamethylene tetramine.

4. The composition of claim 1 wherein the polyamine is butylene diamine.

* * * * *